United States Patent [19]

Hollis, Jr. et al.

[11] Patent Number: 5,039,312
[45] Date of Patent: Aug. 13, 1991

[54] GAS SEPARATION WITH ROTATING PLASMA ARC REACTOR

[75] Inventors: Daniel L. Hollis, Jr., Cottondale; Jerry T. McLendon, Berry; Broderick E. Davis, Tuscaloosa, all of Ala.

[73] Assignee: The United States of America as represented by the Secretary of the Interior, Washington, D.C.

[21] Appl. No.: 477,395

[22] Filed: Feb. 9, 1990

[51] Int. Cl.$^5$ .................................................. B03C 1/00
[52] U.S. Cl. .......................................... 55/3; 55/100
[58] Field of Search ................... 55/3, 100; 219/76, 16

[56] References Cited

U.S. PATENT DOCUMENTS

| | | | |
|---|---|---|---|
| 3,277,631 | 10/1966 | Sunnen | 55/100 |
| 3,843,351 | 10/1974 | Smith et al. | 55/100 |
| 3,893,845 | 7/1975 | Mahaffey et al. | 55/100 |
| 4,090,855 | 5/1978 | Hora et al. | 55/3 |
| 4,174,256 | 11/1979 | Kistemaker | 55/3 |
| 4,394,162 | 7/1983 | Tylko | 75/10.19 |
| 4,458,148 | 7/1984 | Hirshfield et al. | 55/3 |

FOREIGN PATENT DOCUMENTS 1359082  3/1964  France ................................ 55/100

*Primary Examiner*—Jay H. Woo
*Assistant Examiner*—C. Scott Bushey
*Attorney, Agent, or Firm*—E. Philip Koltos

[57] ABSTRACT

Method of separating components from gaseous mixtures in an arc plasma reactor energized by surrounding magnetic field coil windings by producing an electrical arc discharge of at least about 600A at about 22V between a positively charged centrally disposed electrode ball that is movable upwardly or downwardly in a surrounding negatively charged electrode; introducing a plasma working gas of a mixture of a heavy and light gas in spaces between the electrodes at about atmospheric pressure at a temperature of about 10,000° K to produce gas rotation electromagnetically at a rotation rate that is sufficient to force the heavy gas to a peripheral area of the reactor and accumulate the light gas in a centerline area of the reactor; and removing the heavy gas from the peripheral area of the reactor and removing the light gas from the centerline area of the reactor.

10 Claims, 3 Drawing Sheets

GAS SEPARATION WITH ROTATING PLASMA ARC REACTOR

BACKGROUND OF THE INVENTION

1. Field of the Invention

The invention pertains to the use of rotating plasma arc reactors to effect a one stage separation or enrichment of a gas component from a composite gas at a plasma rotational or angular speed of at least 60,000 rpm.

2. Description of the Prior Art $^{235}$U enrichment is effected today mostly with expensive and high energy consuming gaseous diffusion plants and alternative separation devices for such include mechanical centrifuges with rotational speeds of 50,000 rpm.

These mechanical centrifuges are well known; however, in the case of attempting to use these mechanical centrifuges for gas enrichment purposes, difficulty is encountered in maintaining the high angular gas speeds required for separation, and in the case of isotope separation, mechanical centrifuges have angular speeds reaching kHz values, Whitley, S., Review of the Gas Centrifuge until 1962, Part 1 and Part 2, Revs. Mod. Phys., v. 56 No. 1, Jan. 1984, pp. 67–97. and Villani, S., Isotope Separation, Ans, 1976, pp. 207–241, and there is a sufficient angular speed of the plasma to separate gases of different weights due to the centrifuge effect. However, even when high speeds are obtainable, relatively little separation occurs per unit stage, and consequently, many stages are needed to obtain useful separation.

Further, the use of mechanical centrifuges imposes stress and strain on the confining structure of the mechanical centrifuges, with the attendant risk or danger of catastrophic container failure which can lead to possible schrapnel-effect hazards.

Therefore, a need exists in the art of gas separations to avoid the expenses associated with procuring high strength materials required for mechanical centrifuges to avoid catastrophic container failure and to avoid obtaining relatively little gas separation per unit stage when high angular gas speeds are obtained.

SUMMARY OF THE INVENTION

The present invention effects separation of one gas component from a composite gas using a rotating plasma arc reactor wherein the high rate of plasma rotation in the arc plasma reactor provides a centrifuge effect to orient the heavier gas towards a peripheral area of the reactor and orient the lighter gas to a centerline area of the reactor thereby allowing an increased concentration of a chosen gas over all of the others in a composite gas.

The invention plasma reactor operates essentially at atmospheric pressure with a central plasma temperature of about 10,000° K and under peripheral plume temperatures that drop rapidly to between about 1,500° to 3,000° K. The arc welder generator used is capable of supplying varying amounts of power, but typically the current is about 600 A and the arc voltage is around 22 V. The current in the magnetic field windings can be varied from 0 up to about 22 A, but most typically, it is preferred to use about 7 A. Under these conditions, a magnetic induction without the plasma of about 0.0090 T, 90 G, is obtained.

When argon and helium are used as the heavy and light gases for separation, the argon acts as the plasma working gas and it is present in greater concentration than helium. When the roles are reversed, and the helium is the plasma working gas, helium is present in greater concentration than argon.

$$R_e << d << R_i$$

Figure 3:
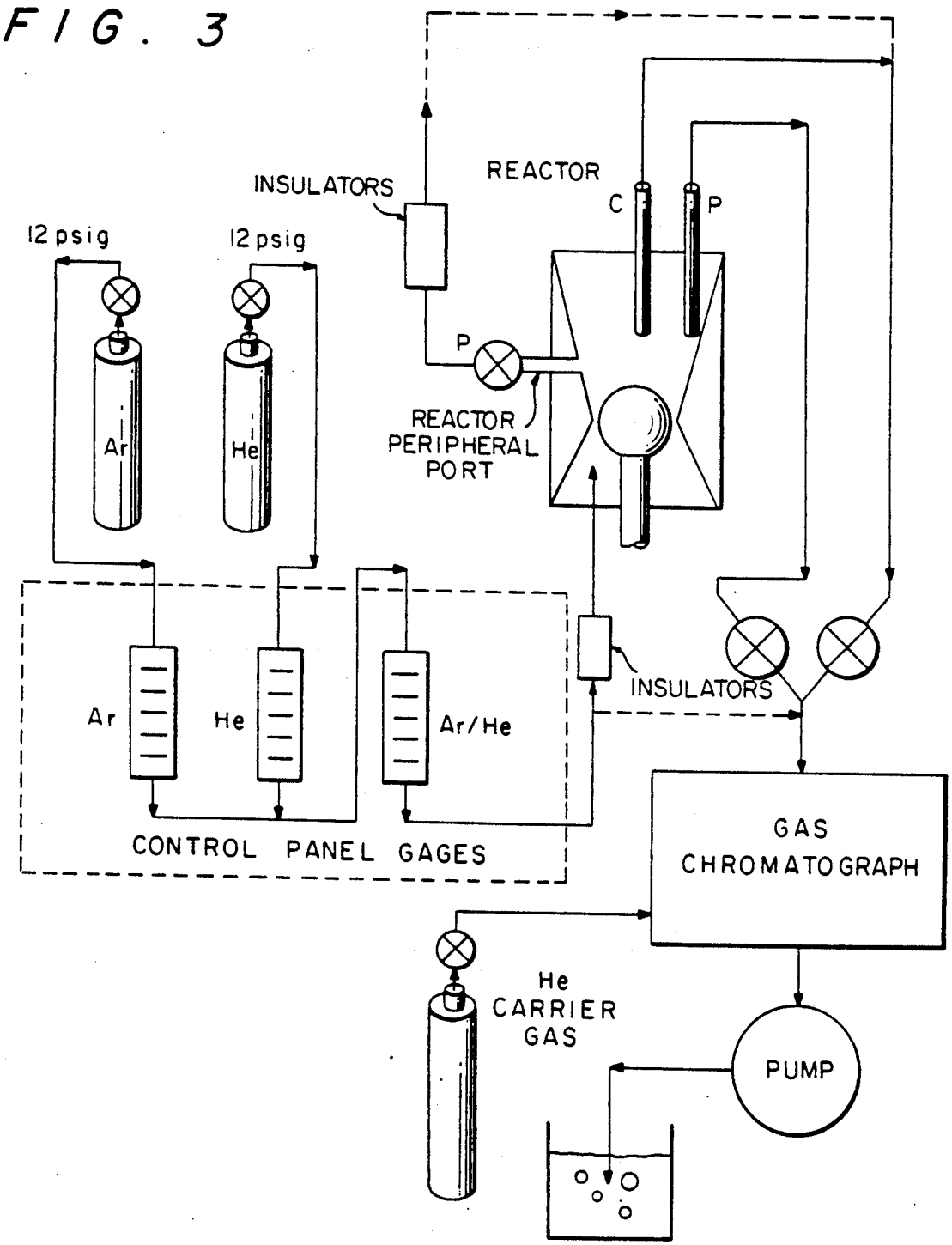

FIG. 3 is a diagram of gas flow to the chromatograph.

DETAILED DESCRIPTION OF THE INVENTION

The invention produces gas rotation electromagnetically without the stress and strain imposed on confining structures of mechanical centrifuges, and does not have the danger of catastropic container failure leading to possible shrapnel-effect hazards or require special high strength materials normally used in mechanical centrifuges. In fact, inexpensive and common materials are used in the invention reactor, and this leads to much reduced initial costs compared to mechanical centrifuges.

Moreover, the reactor is relatively simple and easy to construct and maintain, as there are no moving parts, and the system starts and stops without undue warm-up periods.

Further, the very high operating temperatures of the invention plasma reactor does not exist in mechanical centrifuges, and this enables the invention to be used for special chemical reactions that are useful in high temperature gas separation projects. And since the gas separation per unit is greater than for mechanical centrifuges, fewer stages are required for the desired separation.

An arc plasma reactor was designed (FIG. 1) for gas separation, wherein the components are as follows:

(1) Replaceable graphite positive electrode ball, 1¾" in diameter;
(2) Graphite rod 1" diameter holding electrode ball (1) and conductor for electrical energy from welder generator (3);
(3) Arc welder generator;
(4) Copper contact for electricity from generator (3) to graphite rod (2);
(5) Graphite cylindrical negative electrode tapered from 1⅞" at throat to 2½" at top;
(6) Brass outer shell around negative graphite electrode (5) that acts as a conductor for electrical energy from welder generator (3);
(7) Vertical position mechanism of graphite rod (2) and electrode ball (1);
(8) Windings for magnetic field in reactor volume (9); energy supplied by dc regulated power supply (10); magnetic induction directed along longitudinal axis, $\bar{a}_z$;
(9) Reactor volume where rotating plasma and its plume produce gas separation;
(10) dc regulated power supply which energizes magnetic field windings;
(11) Inlet port for plasma working gas and other gases used in gas separation;

(12) Reactor peripheral port which may be used to draw off heavier gas separated by rotating plasma;

(13) Valve or stopper used to actuate or close reactor peripheral port (12); labeled P to identify gases removed from peripheral region of plasma;

(14) Alumina gas probe C $\frac{1}{4}$" outside diameter (od) $\frac{1}{8}$" inside diameter (id) placed on or near centerline; used to indicate concentration of lighter gas by reduced concentration of heavier gas;

(15) Alumina gas probe P $\frac{1}{4}$" od/$\frac{1}{8}$" id placed at or near plasma periphery; used to measure concentration of heavier gas;

(16) Lava rock holder for probes C and P, which may be used together or singly; holes for probes separated by $\frac{3}{4}$";

(17) Stainless steel $\frac{1}{4}$" od/$\frac{1}{8}$" id lines which take gases to chromatograph valves (18);

(18) Valves used to select gas from C and P probes; when one valve is open, the other is off, and vice-versa;

(19) Gas chromatograph; and

(20) Pump used to pull gases through system.

The reactor consists of a positive central graphite electrode ball 1, of $1\frac{1}{4}$" diameter which can be moved up or down inside of the surrounding negative graphite outer electrode 5. The latter is tapered outward from a throat of $1\frac{7}{8}$" diameter. The replaceable positive ball is snugly fitted onto a 1" diameter graphite rod 2, which can be moved remotely by a vertical position mechanism 7.

To first strike an arc, the ball is placed near the throat where the gap between the ball and outer electrode is small. Argon gas is used as the plasma working gas. For gas separation, a controlled mixture of argon and helium gases is used. The mixture of gases can be varied from mostly argon to mostly helium. Helium is also used as the carrier gas for the chromatograph so that it measures the relative amount of argon in the gas stream.

A DC arc welder generator 3, operating on constant potential mode is capable of supplying currents beyond 1,000 A to the plasma. Typically, however, the current will range around 600 A. Voltage across the arc at 600 A is approximately 22 V. Both the generator voltage and the current can be varied by means of the remote hand control (not shown). A variable regulated dc supply 10, energizes the magnetic field coil surrounding the reactor throat.

The magnetic induction as a function of longitudinal position in the reactor was measured with a F.W. Bell Inc. Gaussmeter, Model 240. At the throat the induction was 0.0030 T for 2.4 A, 0.0090 T for 7 A, and 0.0265 T for 22.2 A.

Figure 1:
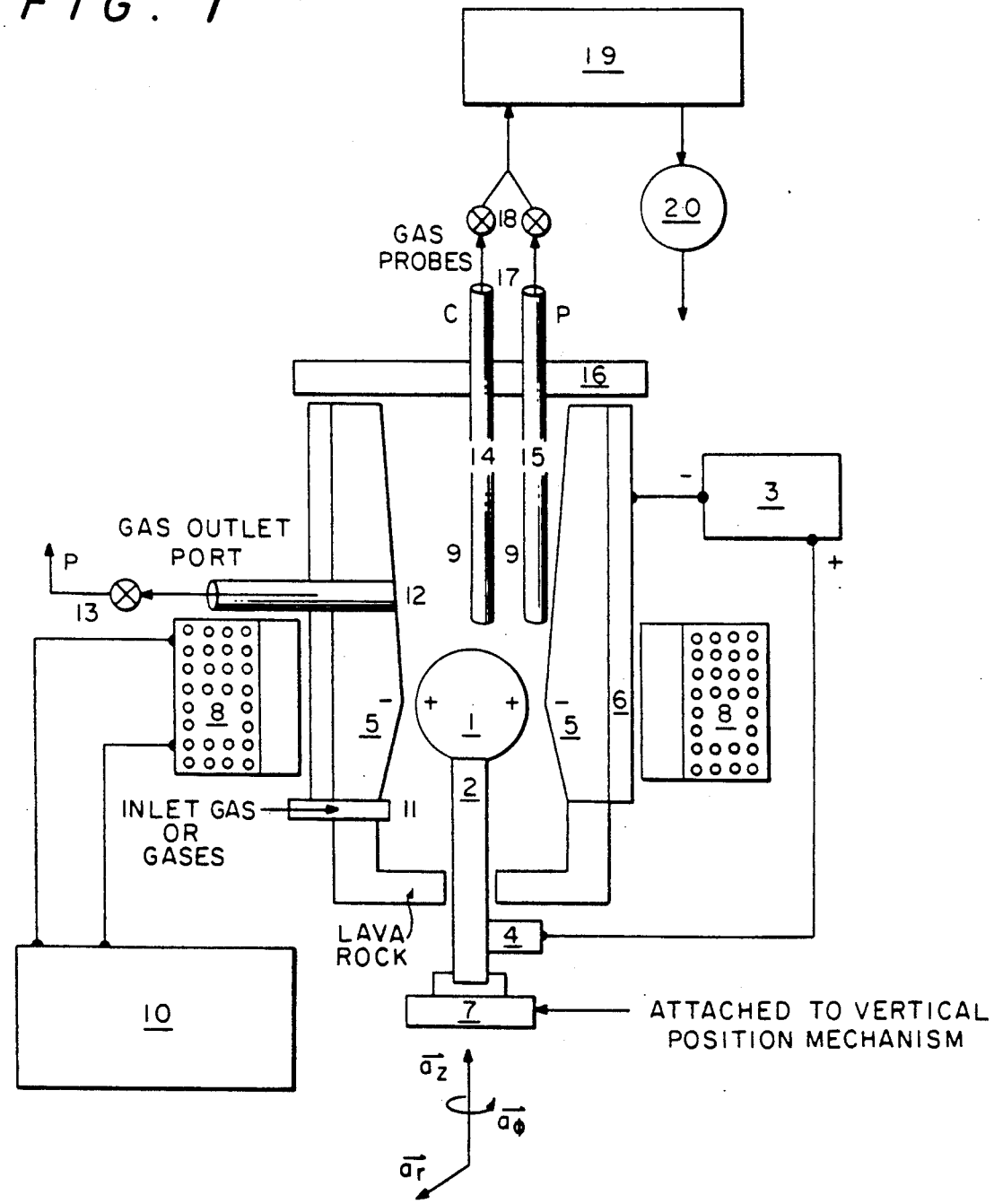
FIG. 1 is a diagram of the arc plasma reactor system configured for gas separation.

For static conditions the electric field E between the two electrodes is roughly $$\vec{E} = -\nabla V \approx (V/d)\vec{a_r}$$

where V is the generator voltage across the gap d, and $\vec{a_r}$ is the radial unit vector as shown in FIG. 1. The magnetic induction from the field coil is directed along the reactor axis in accordance with the following equation:

$$\vec{B}(z) = B(z)\vec{a_z}$$

Figure 2:
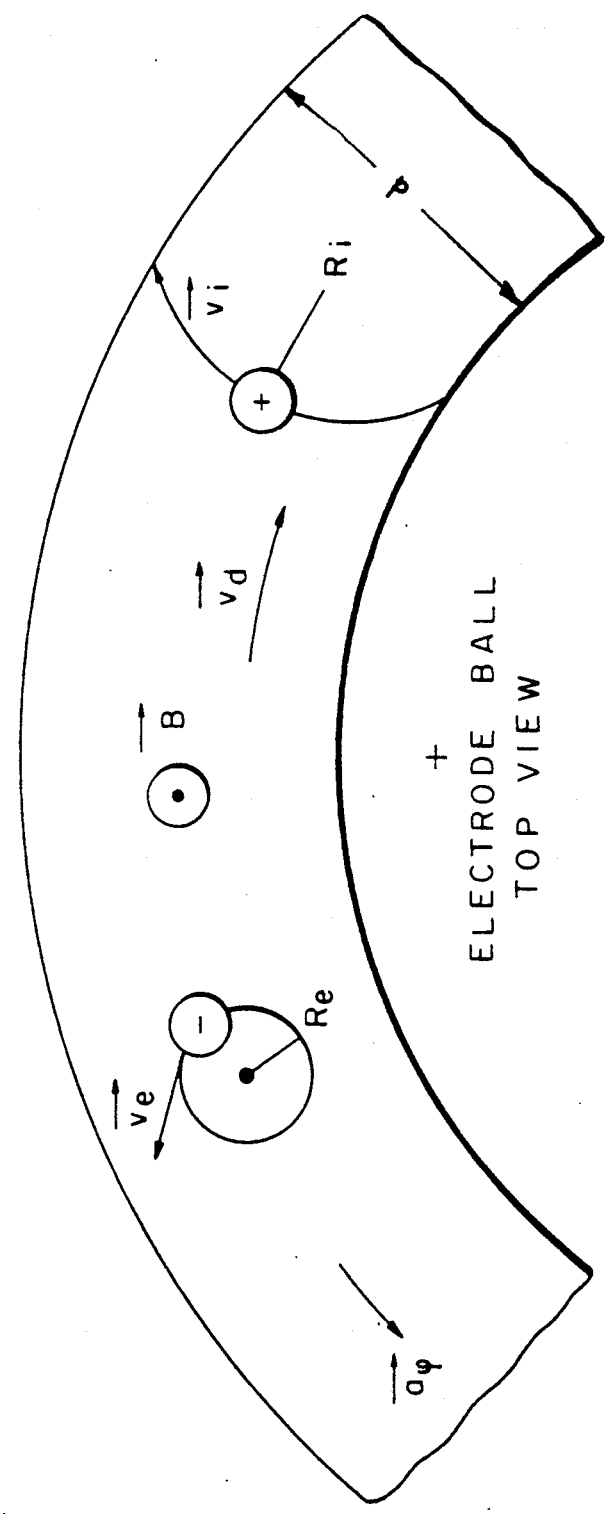
FIG. 2 is a representative gyroradii for electrons and ions for the static case.

Maximum values will occur at the throat, as already stated, with small induction values existing at the reactor top, 9" above the throat. An electric discharge occurs across the gap which produces free electrons and ions. Plasma rotation is the focus of the invention; and in this regard, it is to be observed that charged particles tend to follow their individual motions despite collisional regimes in the plasma. The electrons, because of their small mass, rotate about their gyrocenters due to the imposed $\vec{B}$ with radii much smaller ($\mu$m) than the gap length (mm). On the other hand, ions try to rotate about their gyrocenters, but their radii of gyration are much longer (cm) than the gap; consequently, ions move across the gap with curved paths. FIG. 2 illustrates these conditions for the static case.

Plasma Rotation

The presence of the two fields $\vec{E}$ and $\vec{B}$, orthogonal to each other, causes a drift of the charged particle gyrocenters resulting in a drift velocity $\vec{v_d}$, $$\vec{v_d} = \vec{E} \times \vec{B}/B^2 = -(E/B)\vec{a_\phi}$$

where $\vec{a_\phi}$ is the unit vector in the $\phi$-direction. This drift velocity is invariant to charge and mass, and it applies to both electrons and ions in like manner. The velocity of the plasma rotates about the central electrode ball. Because of this rotation, the plasma volume increases dramatically from the thin discharge thread without the crossed fields to a large region occupying most of the reactor space above the throat.

The drift speed is of the order of hundreds of thousands m/s for typical field values, which is two orders of magnitude greater than the charged particle speeds due to the electric field. This results in a rate of plasma rotation, $v$, in the MHz region. The electron cyclotron frequency, $v_c$, is the frequency of the electron as it revolves about its gyrocenter and is represented by the following equation:

$$v_c = eB/2\pi m,$$

where the electron charge is e, and m is its mass. For values of the magnetic induction used in the reactor, $v_c$ has frequencies ranging from below to above 100 MHz, and electron cyclotron radiations are readily detected. Since the basic radiative process of cyclotron radiation (bremsstrahlung) also applies to electrons rotating about the central electrode ball due to $\vec{v_d}$, it is clear that the plasma motion about the central electrode causes the electrons to radiate with a frequency equal to the rate of plasma rotation. That frequency is represented as follows:

$$v = \frac{v_d}{2\pi R} = \frac{(E/B)}{2\pi R} = \frac{V}{2\pi BdR}$$

where $\overline{R}$ is an average radial plasma position.

The electromagnetic radiations come from the rotating electrons; therefore, it is apparent that the electrons are rotating around the central electrode ball at these high rates. Even though the drift velocity $\vec{v_d}$ is invariant to charge and mass, it appears that the much more massive ions may not rotate around the ball at the same high rate as the electrons. However, this does not prevent a defining plasma property and overall charge neutrality from being maintained, since the electrons appear to slip around the ions and neutrals in such a manner that the net charge is still close to zero. Such a condition is known as the Lorentz model. From the literature Tylko, J.K. (assigned to Plasma Holdings N.V., Curacao, Netherlands, Antilles), Treatment of Matter in Low Temperature Plasmas, U.S. Pat. No. 4,394,162, July 19, 1983, rotation rates of at least 60,000 rpm or higher are needed to maintain stable and useful plasmas for the types of applications of the invention reactor. This angular rate may then be considered as a lower limit to the plasma rotational speed. However, there is no reason to doubt that a much higher rotation rate occurs for the ions, and the same rate as the electrons appear correct.

The electrons appear to come close to following the single-particle model, and response to the Lorentz force results in the small closed loops as discussed. Moreover, radiation measurements support this tendency, Hollis, D. L., Jr. and McLendon, J. T., Magnetic Plasma Rotation in a Metallurgical Process Reactor, IEEE Trans. on Plasma Sci., v. PS-14, No. 4, Aug. 1986, pp. 544–547.

Ions, however, with their large gyroradii may be more susceptible to total plasma effects. They do, nevertheless, respond to the Lorentz force, which acts in the same direction as the gyrocenter drift velocity, since the radial velocity is determined by $\bar{E}$. Singly ionized argon ions in argon (and helium ions in helium) have drift speeds $v_r^i$ less than those for electrons under the same conditions. Since the plasma revolves around the central electrode, a rationale can be used to try to determine the limits to the plasma rotational rate. It is as follows: Let $V_i$ be the effective voltage (less than the full voltage across the gap) that the ions respond to in determining their radial velocity component $v_r^i$, then $$v_r^i = (2\, e\, V_i/M_i)^{\frac{1}{2}}$$

For argon and $V_i = 1$ V, $$v_r^i(1\ V) = 6,900\ m/s$$

The time required for an ion to cross the gap of $\frac{1}{8}''$ at this speed is $$t(1\ V) = d/v_r^i(1\ V) = 4.6(10^{-7})s$$

The observation that the plasma rotates around the central ball electrode suggests that an ion makes at least one complete revolution before reaching the outer electrode. The time of the immediately foregoing equation would then be the period of revolution, or $$\nu(1\ V) = 1/t(1\ V) = 2.2\ MHz$$

If the effective voltage is 0.1 V, then $$\nu(0.1\ V) = 0.22\ MHz$$

However, the effective voltage may be still lower. Even though these estimates are less than the rotation rates from the gyrocenter drift velocity, they are still very large from a centrifugation viewpoint.

Only about 1% of the argon atoms are ionized, but with the large amount of energy delivered to the system it is expected that the gas as a whole will rotate at a rate close to the plasma rate. At least, this is true in regions where there is plasma. In upper reaches of the plume the rotation rate will be less than in the plasma proper.

Measuring for Gas Separation

A Varian Series 1420 Gas Chromatograph 19, with a molecular sieve column and helium as the carrier gas was used to measure the concentration of argon in the various gas streams out of the plasma reactor system. A Hewlett-Packard 3990 A integrator analyzed, displayed, and recorded the data.

FIG. 3 indicates three possible streams. One is labeled C, which represents outlet localities near the plasma centerline, and the other two are marked with P to identify peripheral or near peripheral positions. Any one or any two of these streams may be selected as inputs to the chromatograph. These options are determined by the choice of connections and the use of valves on the "Y" junction leading to the chromatograph. A small exhaust pump pulls the gases from the reactor through the chromatograph. Stainless steel 17, and copper pipes, $\frac{1}{4}''$ in outside diameter and $\frac{1}{8}''$ in inside diameter connect the outlets from the reactor to the chromatograph and gas tanks. Plexiglas connectors act as electrical insulators for the main gas line to the reactor and from the peripheral reactor port to the chromatograph. Various proportions of argon and helium to the reactor can be obtained with the inlet valves to the control panel flow rate meters. The combined gases pass through a flow rate meter before entering the reactor or the combined gases are piped directly to the chromatograph, as indicated by the dashed line in FIG. 3. The peripheral reactor port, marked P in the diagram, is closed when not in use. Two alumina probes 14, 15, $\frac{1}{4}''$ od/$\frac{1}{8}''$ id, marked C and P, may be inserted singly or together from the top of the reactor with their inlets at various heights above the throat.

With helium as the carrier gas and the combined input gas containing argon, the chromatograph registers only argon. If undesired air infiltrates the system, there would be a second peak due to nitrogen. In the arrangement of the invention the chromatograph does not respond to oxygen. Gas pressure at the tanks is kept at the same level to prevent an unlikely flow of one gas into the other tank. In the initial runs, greater argon flow rates than helium flow rates were used, and the two alumina probes were placed with their inlets 2" above the reactor throat. Probe P was against the wall and C was about $\frac{1}{4}''$ toward P away from the centerline. Other orientations may place C at the centerline and P about $\frac{1}{4}''$ away from the wall. The reactor port outlet was closed for these runs. When it was in use alone, the C probe was either placed at the centerline or about midway between the wall and centerline. For tests with the reactor port only, both alumina probes were removed from the reactor.

The centrifuge effect of the rotating plasma forced the heavier gas, argon (atomic weight of about 40), toward the periphery of the reactor volume. The lighter gas, helium (atomic weight of about 4), tended to accumulate near the centerline, and the argon concentration is greatest in the peripheral regions and least near the centerline. The chromatograph then indicated larger readings for the P probes and lesser readings for the C probes, since it responds to argon and not helium.

From references to Whitley, S., Review of the Gas Centrifuge until 1962, Part 1 and Part 2, Revs. Mod. Phys., v. 56, No. 1, Jan. 1984, pp. 67-97 and Villani, S., Isotope Separation, ANS, 1976, pp. 207-241, a separation factor q is defined as the ratio between the relative abundances of the enriched and impoverished fractions of the gases. The expression for q is $$q = exp[(M_2 - M_1)\, \omega^2\, (r^2 - a^2)/2\, RT]$$

The M's are the molecular (or atomic) weights of the gases. Radian frequency $\omega$ is in radians per second; r is radial position in the centrifuge in m, and a is axial position in m. The gas constant is R equal to 8,314 J/°K, and T is temperature in °K.

For the configuration of FIG. 1 with one probe against the outer wall, $r=\frac{7}{8}''=0.0222$ m and $a=\frac{1}{8}''=0.0032$. The temperature was close to the melting point of the alumina probes of 2,050° C., consequently T=2,273° K is the approximate temperature at the probes. With these values, the expression for q becomes $$q=\exp[4.60(10^{-10})\omega^2]$$

For $\omega=(10^4)$ radians/s, q=1.05.

Statistics and Results

Different probe orientations/combinations and line exchanges were tried to secure statistical validity of the data. This was done with and without the plasma in operation. No inherent separation of one gas from the argon-helium composite gas was observed when the plasma was not in operation. The gas chromatograph registered six digit values for most of the tests and five digit numbers were the least recorded, and these large numbers are favorable from a statistical viewpoint Computerized f-tests were used to assure that sets of the chromatograph numbers were or were not significantly different depending on the compared sets. An example of the computer printout of the f-test made on one set of data is given in Table 1, which shows an analysis of variance table for two probes with plasma off.

TABLE 1

| | Position | |
|---|---|---|
| | Periphery | Centerline |
| Response | 632830 | 636510 |
| | 637380 | 635520 |
| | 635910 | 635660 |
| Mean | 635373 | 635897 |
| Grand Mean | 635640 | |

| Source of Variation | Degrees of Freedom | Sums of Squares | Mean Square | f Calculated | f95 Table |
|---|---|---|---|---|---|
| Position | 1 | 4000 | 4000 | 0.142 | 7.7086 |
| Error | 4 | 113000 | 28250 | | |
| Total | 5 | 117000 | | | |

The f-value of 0.142 in this table computed from the experimental data is much less than the tabulated, Davies. O. L., The Design and Analysis of Industrial Experiments, Hofner Pub. Co., 1971 pp. 24, 102 and Snedecor, G. W. and Cockran, W. G., Statistical Methods, 6th ed., Iowa State, 1969, Ch. pp. 91–116, f-number of 7.7086 for 95% confidence level (CL). Thus, there is a better than 95% CL that the set of peripheral numbers is the same as the set of centerline numbers.

These tests confirm that there was no significant separation of argon from the composite gas as measured from any of the P and C locations with the plasma off. Also, changing the magnetic field current from 12 A to 7 A did not affect gas separation with the plasma on. The presence of the alumina probes did not perturb the plasma flow pattern and gas separation to any great extent. Minimum argon concentration, as measured by the chromatograph, was detected with the C probe inlet located about midway between the wall and centerline.

Gas separation was demonstrated with the two probes by placing the C probe at or near the centerline with the P probe near or at the plasma periphery. This was true with the plasma on, but no significant difference was seen with the plasma off. It has been found that the best way to increase the concentration of the heavier gas argon is to use only the reactor peripheral port for the outlet stream. Increased argon concentration in the outlet stream from the reactor peripheral port was measured with the plasma on as compared to the same stream with the plasma off.

Table 2 is an example of f-test analysis applied to this system.

TABLE 2

Analysis of variance table for reactor peripheral port reactor with plasma on and off.

| | ON | OFF |
|---|---|---|
| Response | 96329 | 80337 |
| | 88910 | 83306 |
| | 89095 | 83533 |
| | 89511 | 84025 |
| | 88226 | 83986 |
| | 84114 | |
| Mean | 90003 | 83037 |
| Grand Mean | 86520 | |

| Source of Variation | Degrees of Freedom | Sums of Squares | Mean Square | f Calculated | f95 Table |
|---|---|---|---|---|---|
| Reactor ON/OFF | 1 | 242.6(10)$^6$ | 242.6(10)$^6$ | 15.45 | 5.1174 |
| Error | 9 | 141.4(10)$^6$ | 15.7(10)$^6$ | | |
| Total | 10 | 348(10)$^6$ | | | |

In Table 2 the calculated f-number of 15.45 is such greater than the tabulated value of 5.1174, and this indicates that the set of numbers with the plasma on is different than the set of numbers with the plasma off, and the CL is at least 95%. Therefore, from these results, it is apparent that gas separation and concentration are effected with the rotating plasma of the invention reactor.

A summary of the results demonstrating gas separation with the rotating plasma of the invention is given in Tables 3 and 4.

TABLE 3

Experimental and computational data for gas separation at the peripheral port, reactor on verus ractor off. CL is confidence level.

| Gas flow rate, l/min | | Mag field | Avg. Argon chromatograph reading, reactor | | $\frac{P_{on} - P_{off}}{P_{off}}$ pct. | | $f_{table}$ 95°/CL | Significant difference |
|---|---|---|---|---|---|---|---|---|
| Ar | He | A | ON($\overline{P}_{on}$) | OFF($\overline{P}_{off}$) | | f | | |
| 2.5 | 16.5 | 7.0 | 89,363 | 82,037 | +7.6 | 15.5 | 5.1174 | Yes |
| 5.0 | 10.0 | 7.0 | 199,446 | 168,158 | +18.6 | 309.4 | 5.3177 | Yes |
| 14.0 | 3.7 | 7.0 | 732,850 | 692,116 | +5.9 | 107.8 | 5.9874 | Yes |
| 14.0 | 3.7 | 7.0 | 733,416 | 692,116 | +6.0 | 115.9 | 5.31777 | Yes |

TABLE 4

Experimental and computational data for gas separation at the peripheral (P) compared to the center probe (C). CL is confidence level

| Gas flow rate, l/min Ar | He | Mag field A | Avg. Argon chromatograph reading, probe P | C | C probe position | $\frac{P - C}{C}$ pct. | f | $f_{table}$ 95% CL | Significant difference |
|---|---|---|---|---|---|---|---|---|---|
| 14 | 4 | 7 | 702,394 | 654,013 | Center | +7.4 | 10.26 | 5.9874 | Yes |
| 14 | 3.7 | 7 | 749,036 | 695,846 | Center | +7.6 | 14.44 | 5.3177 | Yes |
| 14 | 3.5 | 8 | 769,502 | 629,502 | Mid | +22.2 | 32.40 | 5.3177 | Yes |
| 14 | 3.8 | 14 | 726,377 | 699,528 | Center | +3.8 | 16.90 | 5.9874 | Yes |

Four tests are shown for actual argon separation, defined as the difference in argon concentration from the reactor peripheral port with the plasma on as compared to the concentration with the plasma off. Let $\bar{P}_{on}$ be the average chromatographic argon value with plasma on and $\bar{P}_{off}$ is the average value with plasma off, then $$\text{percent separation} = (\bar{P}_{on} - \bar{P}_{off})100/\bar{P}_{off}$$

Usually five, and at least three, chromatograph readings were recorded in computing average values, and as stated earlier statistical test were applied to verify that the on-numbers were significantly different from the off-values. The maximum separation is +18.6% with a minimum of +5.9%, and an average separation of +10.3%. Plasma separation of argon is determined by the difference between the P, peripheral plasma, probe and C, central probe:

$$\text{percent plasma separation} = (\bar{P} - \bar{C})100/C$$

For these tests the maximum separation is +22.2% with a minimum of +3.8% and an average of +10.2%. A similar number of readings and statistical attention existed for the latter condition as there were for the former.

It was observed that the state of the electrode ball was important to the proper operation of the separation process. For old, worn balls, the plasma rotation was irregular, and gas separation performance was impaired, and for the electrode balls in use, approximately an hour of operation could be expected before the ball would be excessively worn.

While the rotating plasma arc reactor has been used to separate argon from helium in the preferred embodiment, it is to be understood that such is exemplary only and not limiting of the invention's operativeness for separating heavier gases from lighter gases, such as deuterium (hydrogen$^{-2}$) and protium (hydrogen$^{-1}$) and U-235 and U-238 in the form of uranium hexfluoride gas, which are inclusive of isotoper enrichment.

What is claimed is:

1. A high temperature method of separating a gas component from a gaseous mixture in an arc plasma reactor which is surrounded by a magnetic field winding in a one stage separation, comprising:

energizing said magnetic field winding by a variable regulated dc supply to obtain magnetic induction of between about 0.0030 T to about 0.0265 T;

producing an electrical arc discharge of at least about 600 A at about 22 V between a positively charged centrally disposed electrode ball that is movable upwardly or downwardly in a surrounding negatively charged electrode;

introducing a plasma working gas comprising a mixture of a heavy and light gas in spaces between said electrodes at about atmospheric pressure and a central plasma temperature of about 10,000° K to produce gas rotation electromagnetically at a rotation rate of at least 60,000 rpm to force said heavy gas to a peripheral area of said reactor and accumulate said light gas in a centerline area of said reactor; and using means to remove the heavy gas from said peripheral area of said reactor and means to remove the light gas from said centerline area of said reactor.

2. The method of claim 1, wherein current in the magnetic field winding is between 0 to about 22 A.

3. The method of claim 1, wherein the current is about 7 A.

4. The method of claim 3, wherein said heavy gas is argon and said light gas is helium.

5. The method of claim 4, wherein the separation is performed in one stage.

6. The method of claim 5, wherein the electrodes are made of graphite.

7. The method of claim 3, wherein the gas mixture is deuterium (hydrogen −2) and protium (hydrogen −1).

8. The method of claim 3, wherein the mixture is U-235 and U-238 in the form of uranium hexafluoride gas.

9. The method of claim 7, wherein more than one stage of separation is used.

10. The method of claim 8, wherein more than one stage of separation is used.

* * * * *